United States Patent [19]

Stenger

[11] Patent Number: 5,326,613
[45] Date of Patent: Jul. 5, 1994

[54] TUBULAR POLYAMIDE CASING

[75] Inventor: Karl Stenger, Ruedesheim/Rhein, Fed. Rep. of Germany

[73] Assignee: Hoechst Aktiengesellschaft, Frankfurt am Main, Fed. Rep. of Germany

[21] Appl. No.: 965,532

[22] Filed: Oct. 23, 1992

Related U.S. Application Data

[63] Continuation of Ser. No. 633,040, Dec. 24, 1990, abandoned.

[30] Foreign Application Priority Data

Dec. 27, 1989 [DE] Fed. Rep. of Germany ....... 3943024

[51] Int. Cl.5 .................. B65D 75/00; B65D 85/72
[52] U.S. Cl. ................. 428/34.8; 428/35.5; 428/910; 138/118.1; 525/432
[58] Field of Search ............ 428/34.8, 35.1, 35.5, 428/474.4, 475.5, 910; 138/118.1; 525/432, 435

[56] References Cited

U.S. PATENT DOCUMENTS

| | | | |
|---|---|---|---|
| 4,385,089 | 5/1983 | Bonnebat et al. | 428/36.92 |
| 4,486,507 | 12/1984 | Schumacher | 525/432 |
| 4,604,307 | 8/1986 | Spreeuwers | 428/35.1 |
| 4,607,073 | 8/1986 | Sakashita | 525/432 |
| 4,659,599 | 4/1987 | Strutzel | 428/34.8 |
| 4,886,634 | 12/1989 | Strutzel et al. | 264/560 |
| 4,897,295 | 1/1990 | Erk | 428/35.5 |
| 4,944,970 | 7/1990 | Stenger | 138/118.1 |
| 5,185,189 | 2/1993 | Stenger et al. | 428/34.8 |
| 5,219,002 | 6/1993 | Stenger et al. | 138/118.1 |

FOREIGN PATENT DOCUMENTS 0305959 3/1989 European Pat. Off. .

*Primary Examiner*—Ellis P. Robinson
*Assistant Examiner*—Rena L. Dye
*Attorney, Agent, or Firm*—Foley & Lardner

[57] ABSTRACT

The monolayered, biaxially stretch-oriented and heat-set tubular packaging casing, in particular synthetic sausage casing, is crystal-clear and exhibits high resilience. It is essentially composed of a polymer mixture comprising polyamide-6 and an aromatic copolyamide comprising units of hexamethylene diamine, terephthalic acid and isophthalic acid.

15 Claims, No Drawings

TUBULAR POLYAMIDE CASING

This application is a continuation of application Ser. No. 07/633,040, filed Dec. 24, 1990, now abandoned.

BACKGROUND OF THE INVENTION

The present invention relates to a monolayered, biaxially stretch-oriented and heat-set tubular packaging casing, in particular to a synthetic sausage casing, based on polyamide.

Packaging casings of the type specified above are in most cases produced from polymer mixtures, in order to compensate for certain disadvantageous properties of polyamide. Thus, it is known, for example, to use a mixture comprising polyamide and polyester as a material for sausage casings (EP-A-0,176,980). It has been found, however, that casings of this type are relatively turbid and exhibit an unnatural gloss. It is true that clear casings can be produced from pure polyamide, but these casings have the disadvantage that their permeability to steam is higher than that of comparable casings made of polyamide blends. Moreover, these casings are not suited for the production of large-diameter sausages due to their elastic properties.

Furthermore, a three-layered polyamide casing has been disclosed, which is composed of a central layer comprising a copolyamide with units of hexamethylene diamine, isophthalic acid and terephthalic acid, and two top layers of polyethylene (EP-A-0 305 959). However, this film is not clear due to the PE top layers. It also requires a relatively complicated production process due to its three-layered design.

SUMMARY OF THE INVENTION

It is therefore an object of the present invention to provide a monolayered tubular packaging casing based on polyamide, which is suitable for use as a synthetic sausage casing. In contrast to the known polyamide casings, which often have a pearl-like appearance or a metallic, bluish gloss, the novel casing shall have a natural, crystal-clear appearance.

A further object of the present invention is to overcome another frequent disadvantage of polyamide tubings, which is that, due to their inadequate resilience, they often give creased sausages. The term 'resilience' in this connection defines the ability of a casing to adapt itself to the reduced volume of the simmered or cooked and cooled-down sausage composition and to surround the sausage tightly and without the formation of creases. Furthermore, the casing should adhere well to the sausage and prevent the exudation of liquid from the sausage composition, which results in an undesired deposition of jelly-like matter.

In accomplishing the foregoing objects there is provided according to the present invention a monolayered, biaxially stretch-oriented and heat-set tubular packaging casing, comprising a polymer mixture of polyamide-6 and an aromatic copolyamide comprised of at least one unit each of hexamethylene diamine, isophthalic acid and terephthalic acid. In addition, there is provided a synthetic sausage casing comprising this polymer mixture.

Further objects, features and advantages of the present invention will become apparent from the detailed description of preferred embodiments that follows.

DETAILED DESCRIPTION OF THE PREFERRED EMBODIMENTS

The casing according to the present invention is monolayered and consists of a polymer mixture comprising polyamide-6 and an aromatic copolyamide having hexamethylene diamine, isophthalic acid and terephthalic acid units. The proportion of the aromatic copolyamide can be varied within a wide range. It has, however, been found that the permeability of the casing to water steam is too high when the amount of copolyamide present is less than about 10% by weight. When the amount of copolyamide present is raised to more than about 90% by weight, the casing gets too brittle and cracks form, and its resilience is no longer adequate. Moreover, it adheres too strongly to the sausage meat, so that it can be peeled off from the sausage meat only with difficulty. When the copolyamide is present in an amount of about 10 to 30% by weight, the film exhibits optimum properties for use as a synthetic sausage casing. It then has high gloss and clearness, and compared to other polyamide mixtures containing amorphous polyamides, it also possesses adequate resilience. It is crystal-clear and does not have a metallic luster. Its adhesion to the sausage meat is also satisfactory at this mixing ratio. The loss in weight during storage of the sausages is minimal because of the low permeability to water steam of the casing wall.

In addition to the polymer mixture, the casing may include additives customarily used for producing extruded polyamide tubings, in amounts which are effective in each particular case. Advantageous additives include, for example, slip agents or anti-blocking agents, such as silicone oil, feldspar or precipitated silicic acid.

The casing is produced by extrusion of the monofilm in the form of a tubing, subsequent orientation of the film by stretching in the longitudinal and transverse directions and final heat-setting, whereafter the film is substantially shrink-resistant when being heated again to elevated temperatures. A suitable process of this type is described, for example, in U.S. Pat. No. 4,886,634, which is incorporated herein by reference.

The diameter of the casing corresponds to the sizes which are customary for casings for cooked sausages, such as blutwurst, i.e., it usually is in the range of about 30 to 150 mm, in particular of about 40 to 120 min. Its thickness is relatively low compared to customary sausage casings made from polyamide. In general it is less than about 50 $\mu$m, preferably it is in the range of about 25 to 40 $\mu$m. Despite this low wall thickness, the casing can be stuffed with sausage meat under pressure without problem.

The invention will now be explained in greater detail by means of the Examples which follow.

EXAMPLES 1 TO 3

From dry blend mixtures of polyamide-6 ("Ultramid B") and copolyamide PA 6I/6T ("Grivory G21") (the mixing ratios for the individual Examples are indicated in Table 1 below), a homogeneous melt is plastified in a single-screw extruder at 235° C., extruded through a ring die to give a cast tubing having a diameter of 19 mm and a wall thickness of 0.3 mm, and chilled. Subsequently, the tubing is heated again and subjected to biaxial simultaneous stretching in the stretching zone. The stretching ratios are as follows:

| Transverse stretching ratio | 1:3.3 |
| Longitudinal stretching ratio | 1:2.6 |

Copolyamide PA 6I/6T comprises hexamethylene diamine, isophthalic acid and terephthalic acid. Copolymide PA 6I/6T designated by the trade name "Grivory G21" has a specific gravity of 1.18 g/cm$^3$, a glass transition temperature of 125° C., a tensile strength of 95 N/mm$^2$ and a tensile modulus of 3100 N/mm$^2$.

In this way, tubular casings having a diameter of 61 mm and a wall thickness of 0.035 mm are obtained. In a further process step, the casings are heat-set while still being kept in the blown-up state, in order to prevent them from shrinking in the transverse or longitudinal direction. At temperatures below 80° C., the resulting tubular casings are resistant, or at least largely resistant, to shrinking, and at the same time they are crystal-clear and resistant to tear propagation, so that they can be further processed into sausage casings, stuffed with sausage meat, simmered and cooled down.

Even after a storage period of six weeks at low temperatures, the sausages are surrounded by the tubular casings in a perfectly crease-free manner. The surfaces of the sausages do not have a greyish appearance after this time. No deposition of jelly is observed. The casings can be easily peeled off the sausages, without any sticking of sausage meat to the casing being observed. All sausages have an attractive appearance (high gloss and clearness of the casings).

Comparative Example 1

The PA-6 ("Ultramid B4") used in Examples 1 to 3 is extruded, biaxially stretched and heat-set under the conditions specified in Examples 1 to 3. "Ultramid B4" designates a polyamide-6 having a specific gravity of 1.13 g/cm$^3$, a melting point temperature of 220° C. and a tensile strength of 80 N/mm$^2$.

The resulting casing is highly permeable to steam. After a storage period of only three weeks, a cooked sausage prepared therewith is creasy, and its surface has a greyish appearance (insufficient barrier towards oxygen).

Comparative Example 2

The PA-6 ("Ultramid B4") used in Examples 1 to 3 is mixed with a polyamide of terephthalic acid and trimethylhexamethylene diamine referred to as PA-6-3T and available from Dynamit Nobel under the trade name "Trogamid T". "Trogamid T" has a specific gravity of 1.12 g/cm$^3$, a tensile yield of 691 kp/cm$^2$ and a tensile strength of 685 kp/cm$^2$. The PA-6 and PA-6-3T are mixed at a mixing ratio of 85:15 to give a dry blend and then extruded, biaxially oriented and heat-set under the conditions specified in Examples 1 to 3.

Compared with the casings according to this invention, the resulting tubular casing has good mechanical strength values and is even less turbid. However, in the sausage production process its residual tension is so low that the cooked sausages exhibit creases immediately after their preparation and hence cannot be sold. Additionally, undesired exudation of the sausage meat (jelly formation) is observed.

Comparative Example 3

Instead of the homopolyamide PA-6, a copolyamide of ε-caprolactam with hexamethylene diamine and acelaic acid, referred to as PA-6/69 and available from EMS Chemie under the trade name "Grilon XE 3222", is mixed with PA 6I/6T ("Grivory G21") in a mixing ratio of 85:15 and extruded under the conditions specified in Example 1. Copolyamide PA-6/69 has a specific gravity of 1.13 g/cm$^3$, a melting temperature of 202° C. and a tear resistance of 55 N/mm$^2$. Using this blend, it is not possible to run the stretching process of the tubing regularly, which manifests itself in a considerably varying laid-flat width of the tubing and in nonhomogeneous wall thicknesses.

Furthermore, the specific strength of the film is reduced compared with the films according to the preceding Examples. The resulting tube sections have an increased elongation at break and a reduced δ$_5$-value (reduced dimensional stability). Such a blend is not suited for the production of a biaxially stretch-oriented sausage casing which can be used commercially on a large industrial scale.

TABLE 1

Basic properties of the casings

| | Material (wt. % in the mixture) | Thickness [μm] | Flat width [mm] | 5 l/q [N/mm$^2$] | Tear resistance l/q [N/mm$^2$] | Elong. at break l/q [%] | Permanent deformation 'C' [mm] | Haze [%] | WDD* [g/m$^2$ · d] | O$_2$-permeab. at 85% rel. hum. [cm$^3$ · m$^{-2}$ · d$^{-1}$ · bar$^{-1}$] |
|---|---|---|---|---|---|---|---|---|---|---|
| Example 1 | 90 PA6 10 PA6I/6T | 32–40 | 90–93 | 20/15 | 170/195 | 165/73 | 0.6 | 7 | 15 | 12 |
| Example 2 | 85 PA6 15 PA6I/6T | 39–44 | 91–92 | 16/13 | 221/181 | 112/124 | 0.6 | 7 | 14 | 11.5 |
| Example 3 | 80 PA6 20 PA6I/6T | 36–41 | 91–95 | 20/15 | 146/220 | 120/102 | 0.7 | 7 | 12 | 10 |
| Comp. Ex. 1 | 100 PA6 | 39–41 | 93–95 | 18/19 | 178/268 | 160/80 | 0 | 14 | 20 | 17 |
| Comp. Ex. 2 | 85 PA6 15 PA6-3T | 36–42 | 93–97 | 19/18 | 161/263 | 187/98 | 0.6 | 6 | 14 | not measured |
| Comp. Ex. 3 | 85 PA6/69 15 PA6I/6T | 40–49 | 87–97 | 10/9 | 135/189 | 276/137 | 1.3 | 8 | 18 | not measured |

The technical data were determined according to the following methods:

| Tested property | Test standard or method |
|---|---|
| Tear resistance | DIN 53 455 |
| Elongation at break | DIN 53 455 |
| Haze | DIN 53 490 |
| Permanent deformation | see description in DE-PS 32 27 945 |

TABLE 1-continued

| | Basic properties of the casings | | | | | | | | |
|---|---|---|---|---|---|---|---|---|---|
| Material (wt. % in the mixture) | Thickness [μm] | Flat width [mm] | 5 1/q [N/mm$^2$] | Tear resistance 1/q [N/mm$^2$] | Elong. at break 1/q [%] | Permanent deformation 'C' [mm] | Haze [%] | WDD* [g/m$^2 \cdot$ d] | O$_2$-permeab. at 85% rel. hum. [cm$^3 \cdot$ m$^{-2} \cdot$ d$^{-1} \cdot$ bar$^{-1}$] |

EDD (permeab. to steam) DIN 53 122

TABLE 2

| | Practical suitability of tubings for sausage casings | | | | | | |
|---|---|---|---|---|---|---|---|
| | Material | Crease formation after cooling | Jelly deposition | Weight loss per week [%] | Appearance after 6 weeks (76% r.h.; ≃ +3° C. | Sausage meat adhesion | Color change of sausage meat |
| Example 1 | 90% PA6 10% PA6I/6T | taut | none | 0.8 | crease-free, flabby | good | slight fading at surface |
| Example 2 | 85% PA6 15% PA6I/6T | taut | slight, at ends | 0.8 | taut | good | none |
| Example 3 | 80% PA6 20% PA6I/6T | taut | none | 0.6 | taut | good | none |
| Comp. Ex. 1 | 100% PA6 | taut | none | 1.2 | creasy | adequate | graying |
| Comp. Ex. 2 | 85% PA6 15% PA6-3T | creasy | massive overall depos. | 0.8 | creasy | no | slight |

What is claimed is:

1. An easily peelable, tear resistant, monolayered, biaxially stretch-oriented and heat-set tubular packaging casing having a natural crystal-clear appearance, comprising a polymer mixture of polyamide-6 and an aromatic copolyamide comprised of at least one unit each of hexamethylene diamine, terephthalic acid and isophthalic acid wherein said casing is substantially shrink resistant in both transverse and longitudinal directions at temperatures below 80° C., said tubular packaging casing has been heat set in a blown up state, and wherein said polymer mixture is comprised of about 10 to 90% by weight of said aromatic copolyamide.

2. A casing according to claim 1, which consists essentially of said polyamide-6 and said aromatic copolyamide.

3. A casing according to claim 2, wherein said aromatic copolyamide consists essentially of said hexamethylene diamine, terephthalic acid, and isophthalic acid.

4. A casing according to claim 1, which comprises at least 70% of said polyamide-6.

5. A casing according to claim 1, wherein said polymer mixture is comprised of about 10 to 30% by weight of said aromatic copolyamide.

6. A casing according to claim 1, which comprises at least 80% of said polyamide-6.

7. A casing according to claim 6, which consists essentially of said aromatic copolymer and said polyamide-6.

8. A casing according to claim 1, further comprising at least one additive selected from the group consisting of slip and anti-blocking agents.

9. A casing according to claim 8, wherein said additive is selected from the group consisting of silicone oil, feldspar, and precipitated silicic acid.

10. A casing according to claim 1, wherein the diameter of said casing is in the range of about 30 to 150 mm.

11. A casing according to claim 10, wherein the thickness of said casing is less than about 50 microns.

12. A casing according to claim 11, wherein said thickness is in the range of about 25 to 40 microns.

13. A casing according to claim 1, which is produced by a process comprising the following steps:
 a) extruding a melt comprising a mixture of said polyamide-6 and said aromatic copolyamide so as to produce a tubing,
 b) stretching said tubing in both the longitudinal and transverse directions, and thereafter
 c) heat-setting the stretched tubing.

14. A casing according to claim 13, wherein between said step a) and b) the tubing is chilled.

15. A synthetic sausage casing comprising a polymer mixture according to claim 1.

* * * * *